United States Patent [19]

Laurent et al.

[11] Patent Number: 5,155,184

[45] Date of Patent: Oct. 13, 1992

[54] PROCESS AND APPARATUS FOR CONTROLLING THE MANUFACTURE OF POLYMERS

[75] Inventors: Joseph Laurent; Andre Martens, both of Chateauneuf les Martigues; Jean-Louis Vidal, Martigues, all of France

[73] Assignee: BP Chemicals Ltd., London, England

[21] Appl. No.: 771,794

[22] PCT Filed: Dec. 16, 1988

[86] PCT No.: PCT/GB88/01131
§ 371 Date: Jul. 17, 1989
§ 102(e) Date: Jul. 17, 1989

[87] PCT Pub. No.: WO89/06244
PCT Pub. Date: Jul. 13, 1989

Related U.S. Application Data

[63] Continuation of Ser. No. 631,223, Dec. 21, 1990, which is a continuation of Ser. No. 392,533, Jul. 17, 1989.

[30] Foreign Application Priority Data

Dec. 31, 1987 [FR] France ............................... 87 18559

[51] Int. Cl.⁵ .............................................. C08S 2/00
[52] U.S. Cl. ........................................ 526/59; 364/499; 526/352; 526/348.6; 526/348.4
[58] Field of Search ........................... 526/59, 60, 61; 364/499

[56] References Cited

U.S. PATENT DOCUMENTS

| 4,003,712 | 1/1977 | Miller | 526/59 |
| 4,072,489 | 2/1978 | Loxley et al. | 65/18.1 |
| 4,343,926 | 8/1982 | Caumartin et al. | 526/901 |
| 4,438,180 | 3/1984 | Lang et al. | 428/475.8 |
| 4,448,943 | 5/1984 | Golba et al. | 526/60 |

FOREIGN PATENT DOCUMENTS

| 285251 | 10/1988 | European Pat. Off. . |
| 304232 | 2/1989 | European Pat. Off. . |
| 305090 | 3/1989 | European Pat. Off. . |
| 368560 | 5/1990 | European Pat. Off. . |

OTHER PUBLICATIONS

Chemical Abstracts: vol. 105:115565s, Manufacture of Polymers, Shigeo et al. Apr. 5, 1986.
Callis et al., *Analytical Chemistry*, 59(9), 624A (May 1, 1987).

*Primary Examiner*—Joseph L. Schofer
*Assistant Examiner*—Tom Weber
*Attorney, Agent, or Firm*—Brooks Haidt Haffner & Delahunty

[57] ABSTRACT

A process for the manufacture of a polymer having at least one property P with a desired value D, the process being controlled by periodically sampling the polymer produced, or being produced by the process, determining the value of the property P by applying a correlation relationship with n results $R_i$ of n absorbance measurements obtained by analyzing the sample with an infrared spectrometer at n wavelengths in the near infrared region and then using the difference between the determined value of the property P and the desired value D to control the process parameters using a process computer.

19 Claims, No Drawings

PROCESS AND APPARATUS FOR CONTROLLING THE MANUFACTURE OF POLYMERS

This application is a continuation of application Ser. No. 07/631,223, filed Dec. 21, 1990 which is a continuation of application Ser. No. 07/392,533, filed Jul. 17, 1989.

The present invention relates to a process and an apparatus for the manufacture of polymers, which manufacture is controlled by means of a control system. This process makes it possible to manufacture polymers having physical, rheological or mechanical properties which are set in advance and which are controlled during the polymerization reaction.

There is a known polymerization process, according to U.S. Pat. No. 4,469,853, making it possible to prepare, in particular, polyolefins having one or more properties which are kept substantially constant during the polymerization, this or these properties corresponding to values which are set in advance. These polyolefins are generally prepared in a reactor by polymerization of the olefins in the presence of hydrogen and with the aid of a catalyst of the Ziegler-Natta type in suspension in a liquid hydrocarbon medium. Above the liquid, the polymerization reactor contains a gaseous phase comprising the olefins to be polymerized and hydrogen. The composition of this gaseous phase is determined by means of a gas phase chromatography apparatus connected directly to a process computer provided with a program designed to control the rates of feed of olefins and of hydrogen to the reactor, and the reactor purge rate, so that the composition of the gaseous phase may be continually close to a composition which is set in advance. This program also makes it possible to control the rate of catalyst feed to the reactor and the pressure in the polymerization reactor. However, this process has the disadvantage of controlling a restricted number of properties such as the relative density and/or the flow index of the polyolefin manufactured. It does not make it possible to simultaneously control a large number of physical, rheological and/or mechanical properties which would therefore require that these properties be evaluated only by conventional analytical tests during the quality control of the polyolefin produced. When these conventional tests find the properties to be different from the set values, it would then be necessary to modify the composition of the gaseous reaction phase with a delay which is relatively long. A result of this process is that polymers of unsatisfactory quality may be produced in relatively large quantities.

Generally, it is known to manufacture polyolefins having one or more properties which are kept substantially constant during their preparation. The polyolefins can be for instance manufactured in a reactor containing a gaseous phase consisting of the olefins to be polymerized and optionally an inert gas and/or hydrogen. In that case, the property or properties of the polyolefin manufactured are periodically evaluated during the reaction by means of conventional and specific analyses for each of these properties and the values thus measured are introduced manually into a process computer. The latter is provided with a program comprising, for each of the various qualities of polyolefins manufactured, relationships between the properties of the polyolefin and the composition of the gaseous phase in the polymerization reactor. Depending on the measured values, the computer controls the composition of the gaseous phase by means of its program, so that these measured values may be as close as possible to the set values. The control of the composition of the gaseous phase is carried out with the aid of the feed rates of the various constituents of the gaseous phase in the reactor, and with the aid of the purge rate of this gaseous phase. However, this process involves a separate and specific measurement of each of the properties of the polyolefins which it is desired to keep at substantially constant values during the polymerization. In fact, each of these properties requires the use of a specific apparatus and analytical method. Furthermore, the measurement of each of these properties requires a relatively long time, and this results in a major delay in the correction of the composition of the gaseous phase in the reactor and of the quality of the polymer manufactured. Another disadvantage of this process appears in the manual entry of the results of measurements into the process computer controlling the composition of the gaseous phase.

A process for the manufacture of polymers has now been found, comprising a control system permitting one or more properties of these polymers, which are set in advance, to be controlled, while avoiding the disadvantages mentioned earlier. This process permits a rapid determination of one or more properties of the polymers manufactured, with the aid of a single apparatus. This determination can be performed in an extremely short time and periodically throughout the duration of the polymerization reaction. Furthermore, the results of these determinations can be transmitted instantaneously to a process computer, whose role is to control the process parameters such as, the temperature and the pressure of the polymerisation, and the feed of the various constituents to the polymerization reactor, so that the property or properties of the polymers manufactured may be continually very close to the desired values.

The subject of the invention is therefore a process for the manufacture of a polymer defined by at least one property P equal to a desired value D, the property P characterising the molecular structure of the said polymer, or being related to the molecular structure, the process consisting of polymerising one or more monomers in the presence of a catalyst in a reactor provided with heat transfer means (i.e. heating and/or cooling means), with pressure control means, with feed means and optionally with purge means, which process is characterized in that the property P of the polymer is determined a number of times during the polymerization reaction by the application of a correlation relationship with n results Ri of n absorbance measurements performed by means of an infrared spectrophotometer on the polymer at n wavelengths chosen in the near infrared region from 0.8 to 2.6 microns and in that, depending on the determined values and on the desired value D, process parameters such as the polymerisation temperature, the polymerisation pressure, the flow rates of the various constituents feeding the reactor and optionally the rates of purge of the reactor are controlled by means of a process computer so that the difference between each of the determined values and the desired value is smaller than a set value S.

The process of the invention is suitable for the polymerization of one or more olefinic or vinyl monomers. Among the olefinic monomers there may be mentioned ethylene or alpha-olefins containing from 3 to 10 carbon atoms, such as propylene, 1-butene, 1-pentene, 4 methyl-1-pentene, 1-hexene and 1-octene. Among the olefinic monomers there may also be mentioned the monomers corresponding to the general formula $CH_2=CR_1R_2$ in which $R_1$ and $R_2$ are identical or different radicals denoting a hydrogen atom, an alkyl radical containing from 1 to 8 carbon atoms, or an aryl radical, in particular monomers such as isobutene or styrene. There may also be mentioned conjugated or unconjugated dienes such as butadiene, 1,4-hexadiene, isoprene, ethylidenenorborene and dicyclopentadiene.

Among the vinyl monomers there may be mentioned vinyl chloride, vinyl acetate, vinyl acrylate, methyl methacrylate, methyl vinyl ether, ethyl vinyl ether and acrylonitrile.

It should be noted that the catalyst employed to carry out a polymerization of one or more monomers of this type is chosen from radical catalysts, cationic catalysts, anionic catalysts or else anionic coordination catalysts.

Although the invention is not limited to a specific type of reaction of radical, cationic or anionic polymerization, the description of the process and of the apparatus employed relates particularly to the polymerization of monomers of olefinic type.

Thus, for example, the manufacture of a polyolefin may be carried out by a so-called low pressure polymerization process, in particular at a pressure ranging from 0.1 to 10 MPa and at a temperature ranging from $-20°$ C. to $+300°$ C. The polymerization reaction may, particularly, be carried out in gaseous phase at a temperature ranging from $-20°$ to $+115°$ C. and at a pressure ranging from 0.1 to 5 MPa in a reactor with a fluidized and/or mechanically agitated bed. In a fluidized bed polymerization process, the particles of polymer being formed are kept in the fluidized state by means of a gaseous reaction mixture containing the monomer(s) to be polymerized and moving as an upward stream. The polymerization reaction may also be carried out in liquid phase at a temperature of between $-20°$ C. and $300°$ C. in a reactor maintained at a pressure below 10 MPa, it being possible for the liquid phase to have above it a gaseous phase containing the monomer(s) to be polymerized. In this case, the polyolefin is manufactured in suspension or in solution in a liquid medium which may be either an inert hydrocarbon solvent such as isopentane, n-hexane or n-heptane, or a monomer in the liquid state, such as propylene, isobutene and butenes.

Ethylene polymers or copolymers may also be manufactured in a tubular reactor or in an autoclave by a so-called high pressure process. In a process of this kind, the polymerization reaction can be carried out at a pressure ranging from 20 to 300 MPa and at a temperature ranging from 150° to 350° C., in the presence of a radical catalyst or of an anionic coordination catalyst, such as a catalyst of the Ziegler-Natta type.

According to the present invention, at least one property P of the polymer is determined a number of times and preferably regularly during a continuous or non-continuous polymerization. In practice, a determination of this or these properties can be made for instance at least once approximately every 15 minutes. The property or properties of the polymer manufactured or being manufactured can be chosen from properties characterising the molecular structure of the polymer, such as the comonomer content, the molecular weight, the isotacticity index, the unsaturation content, for example of ethylenic type, and the methyl group content. They can also be selected from physical or rheological properties related to the molecular structure of the polymer, such as the density, the melt index, the degree of crystallinity, the viscosity, the melt flow ratio, and, the molecular weight distribution. They may also be chosen from mechanical properties, such as rigidity, the yield strength, the stress cracking resistance and the impact strength, or from optical properties, such as gloss and transparency.

The determination of the property P is obtained according to the present invention by the application of a correlation relationship with the results of absorbance measurements carried out on the polymer with the aid of a spectrophotometer operating in the near infrared. The absorption measurements are preferably carried out on the polymer freed from its polymerization medium, such as a liquid mixture. These absorption measurements are carried out advantageously by reflection when the polymer is in solid form or is easily isolated in this form, for example in the form of powder or pellets or of an injection-moulded plaque. They are also advantageously carried out by reflection, by transmission or else by a combination of the two when the polymer is in the form of a liquid, for example in the molten state. It is possible to measure the absorbance A of the polymer, which is defined according to the Beer-Lambert law as being the base 10 logarithm of the relationship between the intensity Io of the radiation emitted by the infrared spectrophotometer and the intensity I of the radiation transmitted by the polymer, either by the transmission method, or by the reflection method, or else by a combination of both methods.

According to the invention, n measurements are carried out with the aid of an infrared spectrophotometer at n different wavelengths chosen in the near infrared region from 0.8 to 2.6 microns, preferably from 1.1 to 2.5 microns. The number n of measurements which are carried out is generally from 2 to 20, preferably from 2 to 10. The choice of the number n may depend on the property P of the polymer and partly sets the accuracy with which the property is determined. By way of example, it is possible to choose to carry out the absorbance measurements on the polymer from the following series of wavelengths, expressed in microns, or from substantially closely related wavelengths, particularly to determine the melt index of an ethylene polymer or copolymer:

a) 1.212-1.732-2.316-2.360-2.448 b) 2.332-2.452-2.456 or else in order to determine the density of an ethylene polymer or copolymer:

c) 1.144-1.272-1.688-2.364-2.444 d) 2.320-2.344-2.440 or else to determine the content of at least one of the comonomers in an ethylene copolymer:

e) 1.372-1.512-1.648-2.364-2.444 f) 1.112-1.696-2.184 g) 2.388-2.408 h) 1.504-1.652 or, yet again, in order to determine the molecular weight of an isobutene polymer or copolymer:

i) 2.428-2.464 j) 2.212-2.2216

The wavelengths to be employed for determining the property P can be selected by statistical methods using factor analyses and multilinear regressions. This selection is made so that a correlation relationship can be determined connecting the n results of the absorbance measurements with the property P of the polymer sufficiently accurately to carry out the process. The type of the correlation relationship may be a linear combination, possibly with a constant coefficient, or an algebraical function of n results $R_i$ which may contain quotients or products of the results $R_i$. This relationship depends on the type of spectrophotometer employed, the conditions under which it is employed, on the choice of the wavelengths and on the polymer property P to be determined. In practice, the correlation relationship, the wavelengths and the nunber n of these wavelengths are determined by measurements carried out with the aid of the infrared spectrophotometer on standard polymers. Generally, from 3 to 50 standard polymers are used for which the property or properties P are already known. The measurements carried out on the standard polymers are carried out under the same conditions as those carried out on the polymer manufactured or being manufactured.

From the knowledge of the n results $R_i$ of the absorbance measurements carried out on the polymer, its property P is calculated by the application of the correlation relationship determined for this property P, for example with the aid of a calculator. When the latter is connected directly to the infrared spectrophotometer, the calculation of the property P of the polymer is performed in a very short time. In this case, the complete determination of the property P can take less than 5 minutes, preferably less than 2 minutes, including the time for preparing the sample of polymer.

One of the main advantages of the process is to determine simultaneously several properties P of the polymer, with the help of only one series of absorbance measurements, and thus to control in a very short time the quality of the polymer manufactured.

It is possible, using the process of the present invention, to analyse the polymer product without first having to treat the polymer, e.g. by forming it into a film. Thus according to an aspect of the invention a process for the manufacture of a polymer having at least one property P with a desired value D by polymerising one or more olefinic or vinyl monomers in the presence of a catalyst, the reaction being controlled by:

(a) periodically taking a sample of the polymer,
(b) analysing the sample to determine the value of at least one property P,
(c) generating an input signal representative of the determined value of the property P,
(d) comparing the input signal with a preset value,
(e) generating a control signal as a function of the deviation between the input signal and the preset value, and
(f) controlling process parameters responsive to the control signal characterised in that:
(g) the sample is a liquid polymer or solid polymer which has been treated only to separate it from its polymerisation medium,
(h) the sample is analysed by an infra red spectrometer at n wavelengths in the near infra red region from 0.8 to 2.6 microns, and
(i) the input signal is generated by the application of a correlation relationship using n results $R_i$ of n absorbance measurements.

In the case of a process for the production of polyolefins by gas-phase fluidised bed polymerisation, the sample can be polyolefin powder or particles.

An important element of the process also consists of the introduction of the value(s) of the polymer's properties into a process computer. Advantageously, the process computer may be linked to the infrared spectrophotometer and may calculate the property or properties P of the polymer directly from the values of the n results Ri of the absorbance measurements carried out by means of the infrared spectrophotometer. The process computer is provided with a program which makes it possible to control the process parameters such as the temperature and the pressure of the polymerisation, and the feed rates of the various constituents of the polymerization, as well, optionally, as the reactor purge rates. The various constituents feeding the polymerization reactor may be, in particular, the monomer(s), the catalyst and, optionally, the cocatalyst, a solvent or an inert gas, or a chain-limiting agent such as hydrogen. In order to control the process parameters such as the temperature, the pressure, the feed rates of the constituents of the polymerization and the purge rates, the process computer is linked to the polymerization reactor. When this reactor is fitted with automatic feed and purge valves, the process computer is advantageously linked to these automatic valves. The process computer controls the process parameters such as the temperature, the pressure, the feed and optionally the purge rates of the polymerization reactor according to the desired value D and the determined values of the property P, so that the difference between each of the determined values and the desired value D is less than a set value S. In practice, it is attempted to make the set value S as small as possible. Surprisingly, it is generally found that this set value S represents less than $\pm 10\%$ of the desired value.

The invention also relates to an apparatus for using the process. This apparatus consists essentially of a polymerization reactor coupled to a process computer and to an infrared spectrophotometer, itself optionally linked to a calculator. The polymerization reactor is capable of operating at a pressure which may be between 0.1 and 300 MPa. It has heat transfer means, i.e. heating and/or cooling means, pressure control means, at least one monomer feed conduit, one catalyst feed conduit, polymer sampling means and means for transferring samples into the cell of the infrared spectrophotometer. The sampling system may be a manual device consisting essentially of a lock chamber fitted with values or an automatic device controlled by a programmable automaton. It may be situated directly on the polymerization reactor or else in a polymer bottom discharge conduit.

The process computer, coupled to the polymerization reactor and in particular to its heating and/or cooling means, to its pressure control means, to its feed and optionally to its purge conduits is provided with a program with which it controls the temperature, the pressure, the feed rates of the various constituents of the polymerization and, optionally, the reaction purge rates. The infrared spectrophotometer makes it possible to measure the absorbances A of the polymer corresponding to the Beer Lambert law, either by transmission or by reflection, or else by a combination of both methods. This infrared spectrophotometer is capable of operating at two or more wavelengths in at least one wavelength range belonging to the near infrared, ranging from 0.8 to 2.6 microns. This infrared spectrophotometer may be of the Fourier transform infrared spectrophotometer type, and may be linked to a calculator intended to apply the correlation relationship in order to calculate the property P of the polymer. Advantageously, the process computer may also be employed as a calculator. In this case the spectrophotometer is linked directly to a process computer, which is provided with an additional program permitting the correlation relationship to be calculated.

The present invention is suitable for the manufacture of polyolefins which have one or more properties controlled during their manufacture. These polyolefins may be obtained by polymerization or copolymerization of one or more ethylenically unsaturated monomers such as ethylene, propylene, 1-butene, 1-hexene, 4-methyl 1-pentene and 1-octene. The polymerization or copolymerization of ethylenically unsaturated monomers may be performed in the presence of a catalyst system of the Ziegler-Natta type, consisting, on the one hand, of a solid catalyst (a) based on a transistion metal belonging to groups IV, V or VI of the Periodic Classification of the elements, and, on the other hand, of a cocatalyst (b) consisting of an organo metallic compound of a metal belonging to groups I to III of this Classification. The solid catalyst (a) may, in particular, contain atoms of a transition metal such as titanium and vanadium, halogen atoms and optionally magnesium. The polymerization or copolymerization may also be performed in the presence of a catalyst comprising a chromium oxide compound associated with a granular support based on a refractory oxide and activated by thermal treatment at a temperature of at least 250° C. and not exceeding the temperature at which the granular support begins to sinter, in a non-reductive atmosphere, preferably an oxidizing atmosphere.

The present invention is also suitable for the manufacture of polybutenes or polyisobutenes by polymerization of isobutene and/or of butenes. This polymerization reaction may be carried out continuously, in solution in isobutene or in a mixture of butenes, at a temperature ranging from −30° C. to 80° C. and at a pressure below or equal to 2 MPa. The polymerization can be carried out with the aid of a cationic polymerization catalyst system consisting, for example, of a catalyst such as aluminium trichloride, boron trifluoride or a chlorinated organoaluminium derivative, and optionally of a cocatalyst such as hydrochloric acid, tert-butyl chloride, or water. By virtue of the process of the invention it is possible to obtain polybutenes or polyisobutenes which have, for example, molecular weights which are well controlled during the polymerization reaction.

The present invention may be used for the continuous or noncontinuous manufacture of a polymer having the desired properties. It is found particularly useful in continuous processes, particularly when a change is effected between two polymer qualities which have at least one different property. In order to perform the said change, successive changes are made in the desired value until the final desired value is obtained.

The following nonlimiting examples illustrate the present invention.

EXAMPLE 1

Gas-phase manufacture of a copolymer of ethylene and 1-butene, of the linear low density polyethylene type defined by the following desired properties: 7.5% by weight of 1-butene, a density of 0.918 and a melt index of 0.9 g/10 minutes, measured at 190° C. under 2.16 kg.

The polymerization reaction is carried out in a fluidized bed reactor consisting essentially of a vertical cylinder which has a diameter of 0.9 m and a height of 6 m, provided with a fluidization grid in its lower part and supporting a tranquillization chamber in the form of a vertical cylinder 2.75 m in height and 1.56 m in diameter. The reactor is equipped with feed conduits for 1butene, for ethylene, for nitrogen, for hydrogen and for catalyst and with a gas purge conduit. Each of these conduits is fitted with an automatic valve. The reactor is also equipped with a polymer bottom discharge conduit, equipped with a star-feeder type valve permitting samples of polymer powder to be taken.

The reactor contains a fluidized bed whose height h is kept constant at 2.7 m above the fluidization grid, this bed consisting of a powder of 500 kg of a linear low density polyethylene, in the form of particles with a mass mean diameter of 0.7 mm. This reactor, heated and maintained at 80° C. is fed at a rate of 1 kg/h with a catalyst converted into a prepolymer beforehand and with a catalyst converted into a prepolymer beforehand and This prepolymer is prepared with the aid of a catalyst system of the high-activity Ziegler-Natta type, such as described in Example 1 of French Patent No. 2,405,961, comprising a solid catalyst based on titanium, magnesium and chlorine and corresponding to the general formula

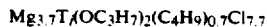

$Mg_{3.7}Ti(OC_3H_7)_2(C_4H_9)_{0.7}Cl_{7.7}$ and a cocatalyst consisting of tri-n-octylaluminium.

A sample of copolymer powder is taken every 15 minutes by means of the valve of the star-feeder type, situated in the polymer bottom discharge conduit.

One series of measurements is carried out by reflection on each sample of copolymer powder which is taken, by means of an "Infraalyzer 500" infrared spectrophotometer sold by the Bran Luebbe company (United States of America), permitting the absorbances of the copolymer corresponding to the Beer-Lambert law to be calculated:

absorbance measurements intended to determine the percentage by weight of 1-butene in the copolymer, at the following 5 wavelengths, expressed in microns: 1.372-1.512-1.648-2.364-2.444, giving the results $R_1$, $R_2$, $R_3$, $R_4$ and $R_5$ respectively;

absorbance measurements, intended to determine the density of the copolymer at the following 5 wavelengths, expressed in microns: 1.144-1.272-1.688-2.364-2.444, giving the results $L_1$, $L_2$, $L_3$, $L_4$ and $L_5$ respectively; and absorbance measurements intended to determine the melt index of the copolymer at the following 5 wavelengths, expressed in microns: 1.212-1.732-2.316-2.360-2.448, giving the results $M_1$, $M_2$, $M_3$, $M_4$ and $M_5$.

All these wavelengths have been selected by a statistical method using factor analysis and multilinear regressions. From these factor analyses and multilinear regressions the three correlation relationships are determined.

The "Infraalyzer 500" infrared spectrophotometer is linked directly to an "HP 1000" calculator sold by the Hewlett Packard company (United States of America). From this series of results, the latter calculates the percentage of 1-butene in the copolymer, its density and its melt index, respectively, by the application of the following 3 correlation relationships:

(s) 1058.632 $R_1$−1265.42 $R_2$+219.705 $R_3$−193.807 $R_4$+177.666 $R_5$+11.715

(b) −2.488 $L_1$+3.864 $L_2$−1.154 $L_3$+0.497 $L_4$−0.391 $L_5$+0.894

(c) −793.694 $M_1$+956.250 $M_2$+167.834 $M_3$−131.338 $M_4$−449.649 $M_5$+8.688

The values determined for the 3 properties of the copolymer are transmitted to a "Solar SP S5 1670" process computer sold by the Bull company (United States of America) and linked directly to the "HP 1000" calculator. The "Solar SP S5 1670" process computer is connected to the automatic valves in the feed conduits for ethylene, for 1 butene, for hydrogen, for nitrogen and for catalyst, and to the automatic valve in the gas purge conduit. This process computer controls the feed rates to the reactor of its various constituents.

It is found for the copolymer manufactured, that in the case of the melt index and of the content of 1-butene in the copolymer, each difference between the determined values and the desired value represents less than 10% of the desired value. It is also noted that in the case of the relative density of the copolymer, each difference between the determined values and the desired value represents less than $10^{-3}$ times the set value i.e. the density was $0.918 \pm 0.001$.

EXAMPLE 2

Gas-phase manufacture of a copolymer of ethylene and 4-methyl-1-pentene defined by the following desired properties: 9% by weight of 4-methyl-1-pentene, a density of 0.918 and a melt index of 0.9 g/10 minutes, measured at 190° C. under 2.16 kg The polymerization reaction is carried out in a fluidized bed reactor identical with that described in Example 1, except for the fact that it is fed with 4-methyl 1-pentene instead of 1-butene under conditions which are otherwise identical with those in Example 1.

A sample of copolymer powder is taken every 15 minutes by means of the valve of the star-feeder type, situated in the polymer bottom discharge conduit.

A series of measurements permitting the absorbances of the copolymer corresponding to the Beer-Lambert law is carried out by reflection on each sample of copolymer powder which is taken, by means of the "Infraalyzer 500" infra red spectrophotometer:

measurements intended to determine the percentage by weight of 4-methyl-1-pentene in the copolymer at the following 3 wavelengths, expressed in microns: 1.112-1.696-2.184, giving the results $A_1$, $A_2$ and $A_3$ respectively;

measurements, intended to determine the density of the copolymer at the following 3 wavelengths, expressed in microns: 2.320-2.344-2.440, giving the results $B_1$, $B_2$ and $B_3$ respectively and measurements, intended to determine the melt index of the copolymer at the following 3 wavelengths, expressed in microns: 2.332-2.452-2.456, giving the results $C_1$, $C_2$ and $C_3$ respectively.

All these wavelengths have been selected by a statistical method using factor analyses and multilinear regression.

The "Infraalyzer 500" infrared spectrophotometer is linked directly to the "HP 1000" calculator. From this series of results, the latter calculates the percentage of 4-methyl-1-pentene in the copolymer, its density and its melt index, respectively, by the application of the following 3 correlation relationships:

(e) $82.281 A_1 + 312.945 A_2 - 348.113 A_3 + 26.260$ (f) $-0.191 B_1 - 0.487 B_2 + 0.658 B_3 + 0.918$ (g) $-26.026 C_1 + 400.526 C_2 - 384.437 C_3 + 2.117$

The values determined for the 3 properties of the copolymer are transmitted to the "Solar SP S5 1670" process computer linked directly to the "HP 1000" calculator. The "Solar SP S5 1670" process computer is linked to the automatic valves in the feed conduits for ethylene, for 4-methyl-1-pentene, for hydrogen, for nitrogen and for catalyst, and to the automatic valve in the gas purge conduit. The process computer controls the feed rates to the reactor of its various constituents.

It is found for the copolymer manufactured that in the case of the melt index and the content of 4-methyl-1-pentene in the copolymer, each difference between the determined values and the desired value represents less than 10% of the desired value. It is also noted that in the case of the density of copolymer, each difference between the determined values and the desired value represents less than $10^{-3}$ times the set value i.e. the density was controlled to $0.918 \pm 0.001$.

EXAMPLE 3

Gas-phase manufacture of a terpolymer of ethylene, 1-butene and 4-methyl-1-pentene defined by the following desired properties: 3% by weight of 1-butene and 6% by weight of 4-methyl-1-pentene The polymerization reaction is carried out in a fluidized bed reactor identical with that described in Example 1, except for the fact that it is additionally fed with 4-methyl-1-pentene and in conditions which are otherwise identical with those in Example 1.

A sample of terpolymer is taken every 15 minutes by means of the automatic valve of the star feeder type situated in the polymer bottom discharge conduit.

A series of measurements which make it possible to calculate the absorbances of the terpolymer corresponding to the Beer-Lambert law is carried out by reflection on each sample of terpolymer powder which is taken, by means of the "Infraalyzer 500" infrared spectrophotometer:

measurements, intended to determine the percentage by weight of 1-butene in the terpolymer at the following two wavelengths, expressed in microns: 2.388 and 2.408, giving the results D1 and D2 respectively and measurements, intended to determine the percentage by weight of 4-methyl-1 pentene in the terpolymer at the following two wavelengths, expressed in microns: 1.504 and 1.652, giving the results E1 and E2 respectively.

All these wavelengths have been selected by a statistical method using factor analyses and multilinear regressions.

The "Infraalyzer 500" infrared spectrophotometer is linked directly to the "HP 1000" calculator. From this series of results, the latter calculates the percentage by weight of 1-butene in the terpolymer and the percentage of 4-methyl-1-pentene therein by the application of the following 2 correlation relationships:

(h) $354.379 D_1 - 357.101 D_2 + 3.871$ (i) $-1826.446 E_1 + 1849.614 E_2 - 25.028$

The values determined for the 3 properties of the terpolymer are transmitted to the "Solar SP S5 1670" process computer linked directly to the "HP 1000" calculator. The "Solar SP S5 1670" process computer is linked to the automatic valves in the feed conduits for ethylene, for 1 butene, for 4-methyl-1-pentene, for hydrogen, for nitrogen and for catalyst, and to the automatic valve in the gas purge conduit. The process computer controls the feed rates to the reactor of its various constituents. It is found for the terpolymer manufactured that in the case of the content of 4-methyl-1-pentene and the content of 1-butene, each difference between the determined values and the desired value represents less than 10% of the desired value.

EXAMPLE 4

Gas-phase manufacture of a polymer of ethylene defined by the following desired properties: a density of 0.950 and a melt index of 1.3 g/ 10 minutes, measured at 190° C. under 5 kg.

The polymerization reaction is carried out in a fluidized bed reactor consisting essentially of a vertical cylinder which has a diameter of 0.9 m and a height of 6 m, provided with a fluidization grid in its lower part and supporting a tranquillization chamber in the form of a vertical cylinder 2.75 m in height and 1.56 m in diameter. The reactor is equipped with feed conduits for ethylene, for nitrogen, for hydrogen, for catalyst and for tri-n-octylaluminum and with a gas purge conduit. Each of these conduits is fitted with an automatic valve. The reactor is also equipped with a polymer bottom discharge conduit, equipped with a star-feeder type valve permitting samples of polymer powder to be taken.

The reactor contains a fluidized bed whose height h is kept constant at 2.7 m above the fluidization grid, this bed consisting of a powder of 500 kg of a high density polyethylene, in the form of particles with a mass mean diameter of 1.2 mm. This reactor, heated and maintained at 108° C. is fed at a rate of 0.3 kg/h with a catalyst converted into a prepolymer beforehand and consisting of particles with a mass mean diameter of 0.19 mm. This prepolymer is prepared with the aid of a catalyst such as described in Example 1 of French Patent No. 2,570,381, comprising a solid catalyst based on chromium oxide on silica and activated by a heat treatment and with the aid of diethylaluminium ethoxide and tri-n-octylaluminium.

A sample of copolymer powder is taken every 15 minutes by means of the value of the star-feeder type, situated in the polymer bottom discharge conduit.

A series of measurements is carried out by reflection on each sample of polymer powder which is taken, by means of an "Infraalyzer 500" infrared spectrophotometer sold by the Bran Luebbe company (United States of America), permitting the absorbances of the copolymer corresponding to the Beer-Lambert law to be calculated:

measurements, intended to determine the density of the polymer at the following 5 wavelengths, expressed in microns: 1.144–1.272–1.688–2.364–2.444, giving the results $G_1$, $G_2$, $G_3$, $G_4$ and $G_5$ respectively; and measurements intended to determine the melt index of the polymer at the following 5 wavelengths, expressed in microns: 1.212–1.732–2.316–2.360–2.448, giving the results $H_1$, $H_2$, $H_3$, $H_4$ and $H_5$.

The "Infraalyzer 500" infrared spectrophotometer is linked directly to an "HP 1000" calculator sold by the Hewlett Packard company (United States of America). From this series of results, the latter calculates the density of the polymer and its melt index, respectively, by the application of the following 2 correlation relationships:

(h) $-2.488$ $G_1+3.864$ $G_2-1.154$ $G_3+0.497$ $G_4-0.391$ $G_5+0.894$ (i) $-793.694$ $H_1+956.25$ $H_2+167.834$ $H_3-131.338$ $H_4-449.649$ $H_5 +8.688$

The values determined for the 2 properties of the polymer are transmitted to a "Solar SP S5 1670" process computer sold by the Bull company (United States of America) and linked directly to the "HP 1000" calculator. The "Solar SP S5 1670" process computer is connected to the automatic valves in the feed conduits for ethylene, for hydrogen, for nitrogen, for catalyst, and for tri-n-octylaluminium and to the automatic valve in the gas purge conduit. This process computer controls the feed rates to the reactor of its various constituents.

It is found for the polymer manufactured, that in the case of the melt index each difference between the determined values and the desired value represents less than 10% of the desired value. It is also noted that in the case of the density of the polymer, each difference between the determined values and the desired value represents less than $10^{-3}$ times the set value.

EXAMPLE 5

Manufacture of a polybutene defined by the following desired property: number average molecular weight of 2000

Approximately 50 millimoles/hour of boron trifluoride and approximately 6 kg/hour of a mixture of butenes and of butanes, comprising:

| | |
|---|---|
| isobutene: | 49.9% by weight |
| 1-butene: | 29.7% by weight |
| cis-2-butene: | 8.3% by weight |
| trans-2-butene: | 7.8% by weight |
| n-butane: | 3.4% by weight |
| isobutane: | 0.9% by weight | are introduced continuously into a tubular reactor 5 m in length and 2.5 mm in diameter, maintained at a temperature of 45° C. A polymer sample is taken every 10 minutes at the reactor exit. After the former has been degassed, a series of measurements of absorbances of the polymer is carried out by transmission at the following two wavelengths, expressed in microns: 2.428 and 2.464, by means of the "Infraalyzer 500" infrared spectrophotometer, in order to determine the number average molecular weight of the polymer. The results of the measurements are respectively F1 and F2. The "Infraalyzer 500" infrared spectrophotometer is linked directly to the "HP 1000" calculator. The latter calculates the number average molecular weight of the polybutene by the application of the following correlation relationship: 13,786.75 $F_1-10,087.15$ $F_2-2100.41$.

The determined values of the number average molecular weight of the polymer are transmitted to the "Solar SP S5 1670" process computer linked directly to the "HP 1000" calculator. The "Solar SP S5 1670" process computer controls the feed rate of the mixture of butanes and butenes.

It is found for the polymer manufactured that in the case of the number average molecular weight of the polymer manufactured, each difference between the determined values and the desired value represents less than 10% of the desired value.

We claim:

1. Process for the manufacture with the aid of a process computer of a polymer with at least one property P maintained at desired value D, the property being a physical, rheological, or mechanical property of the polymer, the process comprising polymerising one or more monomers in the presence of a catalyst in a reactor, which reactor is provided with heat transfer means, with pressure control means, and with feed means;

withdrawing from the reactor at selected time intervals a sample of the polymer;

measuring the near infrared absorbance of the sample at n wavelengths in the range of from 0.8 to 2.6 microns, wherein n is at least two, the n near infrared wavelengths having been chosen by statistical methods by measurements on selected standard polymers to correlate to property P, wherein the polymer is defined by at least one property chosen from the density, the viscosity, the isotacticity index, the melt index, the degree of crystallinity, the melt flow ratio, the molecular weight, the molecular weight distribution, the rigidity, the yield strength, the stress cracking resistance, the impact strength, the gloss, and the transparency;

calculating by application of the correlation relationship to the measured absorbances to provide a measured value of P; and controlling the process parameters by a process computer which compares desired value D with the measured value and adjusts at least one of the means to keep the difference between desired value D less than set value S.

2. Process according to claim 1, characterized in that the monomers are olefins chosen from ethylene or alpha-olefins containing from 3 to 10 carbon atoms.

3. Process according to claim 1, characterized in that the monomers correspond to the general formula $CH_2-CR_1R_2$, in which $R_1$ and $R_2$ are identical or different radicals denoting a hydrogen atom, an alkyl radical containing from 1 to 8 carbon atoms or an aryl radical.

4. Process according to claim 1, characterized in that the monomers are chosen from vinyl chloride, vinyl acetate, vinyl acrylate, methyl methacrylate, methyl vinyl ether, ethyl vinyl ether and acrylonitrile.

5. Process according to claim 1, characterized in that the catalyst employed is chosen from radical catalysts, cationic catalysts, anionic catalysts or anionic coordination catalysts.

6. Process according to claim 1, characterized in that the polymerization reaction is carried out in gaseous phase in a reactor with a fluidized and/or mechanically agitated bed at a pressure ranging from 0.1 to 5 MPa and a temperature ranging from −20° to +115° C.

7. Process according to claim 1, characterized in that the polymerization reaction is carried out in suspension or in solution in a liquid hydrocarbon medium, at a pressure below 10 MPa and at a temperature ranging from −20° to 300° C.

8. Process according to claim 1, characterized in that the catalyst for the polymerization reaction is a solid catalyst based on chromium oxide activated by a thermal treatment, or a catalyst system of the Ziegler-Natta type consisting, on the one hand, of a solid catalyst based on a transition metal belonging to Groups IV, V or VI of the periodic classification of the elements and, on the other hand, of a cocatalyst consisting of an organometallic compound of a metal belonging to Groups I to III of this classification.

9. Process according to claim 1, characterized in that a property P of the polymer is determined in a period of less than or equal to 5 minutes.

10. Process according to claim 1, characterized in that the property P of the polymer is determined at least once every 15 minutes during the polymerization reaction.

11. Process according to claim 1, characterized in that the polymer isdefined by at least one property chosen from the density, the viscosity, the isotacticity index, the melt index, the content of at least one of the comonomers forming the polymer, the degree of crystallinity, the melt flow ratio, the molecular weight, the molecular weight distribution, the unsaturation content of ethylenic type, the methyl group content, the rigidity, the yield stress, the stress cracking resistance, the impact strength, the gloss and the transparency.

12. Process according to claim 1, characterized in that the correlation relationship is a linear function or an algebraic function of n results Ri of the absorbance measurements carried out on the polymer.

13. Process according to claim 1, characterized in that the number n of the absorbance measurements carried out on the polymer is between 2 and 20 and preferably between 2 and 10.

14. Process according to claim 1, characterized in that the absorbance measurements are performed by means of the infrared spectrophotometer by reflection on a polymer which is in a solid form or is easily isolated in this form.

15. Process according to claim 1, characterized in that the absorbance measurements are carried out on the polymer, by means of the infrared spectrophotometer, at wavelengths, expressed in microns, or at substantially closely related wavelengths, chosen from the following series:
 a) 1.212–1.732–2.316–2.360–2.448
 b) 2.332–2.452–2.456
 c) 1.144–1.272–1.688–2.364–2.444
 d) 2.320–2.344–2.440
 e) 1.372–1.512–1.648–2.364–2.444
 f) 1.112–1.696–2.184
 g) 2.388–2.408
 h) 1.504–1.652
 i) 2.428–2.464
 j) 2.212–2.216.

16. Process according to claim 1, characterized in that the correlation relationship is determined beforehand by multi-variant regression with the results of absorbance measurements carried out on 3 to 50 standard polymers of previously known properties, under conditions identical to the absorbance measurements carried out on the polymer manufactured or being manufactured.

17. Process according to claim 1, characterized in that the constituents feeding the polymerization reactor are the monomer(s), the catalyst, the cocatalyst, an inert gas, a solvent, and a chain-limiting agent.

18. Process according to claim 1, characterized in that the set value S represents 10% of the desired value D.

19. A process according to claim 1, wherein at least two properties are maintained at respective desired values.

* * * * *

UNITED STATES PATENT AND TRADEMARK OFFICE
CERTIFICATE OF CORRECTION

PATENT NO. : 5,155,184
DATED : October 13, 1992
INVENTOR(S) : Joseph Laurent et al.

It is certified that error appears in the above-identified patent and that said Letters Patent is hereby corrected as shown below:

Col. 2, line 51, "Ri" should read --$R_i$--.

Col. 3, line 9, "ethylidenenorborene" should read "ethylidenenorbor$\underline{n}$ene".

Col. 8, lines 1 and 2, "1butene" should read --1-butene,--.

Col. 8, line 16, after "and" and before "This" insert --consisting of particles with a mass mean diameter of 0.2 mm.--.

Signed and Sealed this

Ninth Day of February, 1993

Attest:

STEPHEN G. KUNIN

Attesting Officer      Acting Commissioner of Patents and Trademarks